United States Patent [19]
Eckardt et al.

[11] Patent Number: 5,645,866
[45] Date of Patent: Jul. 8, 1997

[54] PRESSURE CONTROLLING AND/OR REGULATING DEVICE FOR A FLUID MEDIUM, IN PARTICULAR AIR OR GAS

[75] Inventors: Helmut Eckardt; Johann Holzschuh, both of Meinerzhagen; Jürgen Ehritt, Hilchenbach; Michael Renger; Rolf Schwesinger, both of Meinerzhagen, all of Germany

[73] Assignee: Battlefeld GmbH, Meinerzhagen, Germany

[21] Appl. No.: 424,349

[22] PCT Filed: Oct. 29, 1993

[86] PCT No.: PCT/EP93/03021

§ 371 Date: Jul. 11, 1995

§ 102(e) Date: Jul. 11, 1995

[87] PCT Pub. No.: WO94/09962

PCT Pub. Date: May 11, 1994

[30] Foreign Application Priority Data

Oct. 29, 1992 [DE] Germany .......................... 42 36 460.4

[51] Int. Cl.[6] ................................................. B29C 45/16
[52] U.S. Cl. .................... 425/130; 264/572; 425/145; 425/146
[58] Field of Search ............................ 425/130, 145, 425/146; 264/572

[56] References Cited

U.S. PATENT DOCUMENTS

| 4,030,523 | 6/1977 | Cram et al. | |
|---|---|---|---|
| 4,781,554 | 11/1988 | Hendry | 264/572 |
| 5,204,050 | 4/1993 | Loren | 264/572 |
| 5,362,222 | 11/1994 | Faig et al. | 425/149 |
| 5,423,667 | 6/1995 | Jaroschek | 264/572 |
| 5,466,141 | 11/1995 | Eckardt et al. | 264/572 |

FOREIGN PATENT DOCUMENTS

| 0033144 | 8/1981 | European Pat. Off. |
| 0310914 | 4/1989 | European Pat. Off. |
| 2455767 | 11/1980 | France . |
| 5004253 | 1/1993 | Japan . |
| 9114559 | 10/1991 | WIPO . |

Primary Examiner—Tim Heitbrink
Attorney, Agent, or Firm—Anderson Kill & Olick

[57] ABSTRACT

It is proposed that a pressure control device and/or pressure regulating device (8) be used for a fluid medium, in particular air or gas, preferably nitrogen, which is to be supplied to an injection mold in addition to the molten plastic, this pressure control device and/or pressure regulating device (8) being provided as a stationary, but preferably as a mobile unit between a pressure generator/pressure accumulator (7) and an injection system associated with the injection mold (3), e.g., in a nozzle head or add-on building block. The device has a main line (21) which leads from the pressure generator/pressure accumulator (7) to the injection system (27) and which is switchable by means of valve control only in such a way that it either lets through or blocks the inflow of media, a first branch line (28) leading to a receiver side of a pressure sensor (29) whose other receiver side is sensitive to the pressure of the medium in the injection mold, and a second branch line (30) which can be switched so as to let through or block flow via a valve control influenced by the pressure sensor (29) and, in so doing, forms a media outflow from the injection mold, in particular a return of media to the pressure generator/pressure accumulator (7). Essential features of this device consist in that the main line (21) branches into at least two parallel flow paths (23a and 23b), that each flow path (23a and 23b) is outfitted with a media inflow control valve (24a and 24b) which may be operated to let through or block flow, as required, that the media inflow control valves (24a and 24b) have different flow cross sections (25a, 25b), and that these media inflow control valves (24a and 24b) can be controlled individually and/or jointly in a stepwise manner depending on the pressure difference determined by the pressure sensor (29).

10 Claims, 8 Drawing Sheets

PRESSURE CONTROLLING AND/OR REGULATING DEVICE FOR A FLUID MEDIUM, IN PARTICULAR AIR OR GAS

BACKGROUND OF THE INVENTION

1. Field of the Invention

The invention is directed to a pressure control device and/or pressure regulating device for a fluid medium to be fed to an injection mold in addition to the molten plastics, this pressure control device and/or pressure regulating device being provided between a pressure generator and an injection system associated with the injection mold and having a main line which leads from the pressure generator to the injection system and branches into at least two parallel flow paths, each flow path being outfitted with a media inflow control valve which may be operated to let through or block flow, as required, and wherein a first branch line and second branch line branch off from the main line downstream of the junction of the two flow paths, wherein the second branch line can be switched so as to either let through or block flow via a media outflow control valve and in so doing forms a media outflow from the injection mold.

2. Description of the Related Art

A pressure control device and/or pressure regulating device of this type is already known from DE 37 34 164 A1 and EP-03 10 914 A2 and has also proven fundamentally successful in practice. However, shortcomings persist on the one hand in that an exact and precisely reproducible regulation of pressure cannot always be achieved and, on the other hand, regulation does not function equally reliably for both small and large volumes of media per time unit.

In another pressure control device and/or pressure regulating device known from WO 91/14 559 A1, it is possible to achieve an exact and precise reproducible regulation of pressure; however, the relatively high technical cost for constructing this control device and/or regulating device is disadvantageous. Moreover, in the known arrangement the entire pressure monitoring system can be operated only in exclusive dependence on the existing control arrangement (control panel) so that regulation is not equally dependable for both small and large volumes of media per time unit.

Therefore, the object of the present invention is to ensure faultless operation of the pressure control device and/or pressure regulating device regardless of whether the required throughput volume of media per time unit is small or large and to enable simpler storage of data affecting remote control together with other processing parameters on electrical or magnetic data storage media.

SUMMARY OF THE INVENTION

This object is met according to the invention in that the first branch line leads to one side of a pressure sensor whose other side, the receiver side, is sensitive to the pressure of the medium in the injection mold, in that the media outflow control valve in the second branch line is influenced by the pressure sensor, in that the media inflow control valves in the parallel flow paths of the main line have different flow cross sections, and in that these media inflow control valves can be controlled individually and/or jointly in a stepwise manner by means of the final control elements of a closed loop or regulating circuit so as to let through or block flow depending on the difference between the pressure in the first branch line and the pressure in the mold cavity of the injection mold, which pressure difference is detected by the pressure sensor.

The distinctive character of the proposed solution according to the invention lies not only in the fact that the pressure prevailing in the mold cavity of the injection mold can directly influence the switching state of the media outflow control valve, but that, beyond this, it is possible to allow three different volume flows of the fluid medium per time unit to pass through the main line using only two media inflow control valves.

The pressure control device and/or pressure regulating device according to the invention has the advantage that not only seat valves but also other remote-controllable valves, e.g., proportional valves, can be used for the media inflow control valves as well as for the media outflow control valve, provided they meet the established criteria for regulating the volume of media to be fed to an injection mold.

According to the invention, the flow cross sections of the two media inflow control valves located in the main line advantageously have a ratio of 1.0:0.8 and the flow cross section of the media outflow control valve in the second branch line corresponds to the flow cross section of the smallest media inflow control valve in the main line.

The invention also provides that the media inflow control valves in the main line and the media outflow control valve in the second branch line are controllable via a PID controller and a logic circuit, that the PID controller communicates with an actual pressure value input acted upon continuously by the pressure sensor and a reference pressure value input which can be influenced by a ramp adjuster, and that, in so doing, a rising and/or falling pressure profile which can be sensed by the pressure sensor in the injection mold can be predetermined via the ramp adjuster.

The various control valves are switched so as to let through or block flow depending on the pressure gradient. For instance, if the pressure sensor responds to a sudden pressure drop during injection of the fluid medium (air or gas) into the cavity of the injection mold, either the smaller media inflow control valve will be switched over to the larger media inflow control valve or the media inflow control valve which was previously not in operation will be switched on in addition to the already effective media inflow control valve in order to eliminate this pressure drop as quickly as possible.

According to the invention, it is also provided that one input of the PID controller is acted upon directly by the output of an actual pressure value differential amplifier, while the second input of the PID controller is acted upon, via the output of the ramp adjuster, by a reference pressure value differential amplifier and a pressure profile differential amplifier. Moreover, the output of the actual pressure value differential amplifier and the output of the ramp adjuster are also connected in each instance to an input of a comparator whose output is connected with an input of the logic circuit.

The logic circuit has at least four inputs which are acted upon respectively by a PID controller, a clock generator or oscillator, a diaphragm signal transmitter and the comparator, while the logic circuit is provided with three outputs which can be connected respectively to each of the two media inflow control valves and to the media outflow control valve.

According to the invention, one of two additional inputs of the logic circuit can be activated when the media outflow control valve is actuated, while the other input is activated when the pressure control device and/or pressure regulating device is switched on.

A particular advantage of the pressure control device and/or pressure regulating device according to the invention consists in that all constructional and functional components are combined in a housing to form a building block or module which is outfitted with contact connector devices for the components which can be influenced electrically and with coupling connector devices on the input and output side for the components which can be influenced fluidically.

Apart from the fact that every building block or module can accordingly be exchanged by a few simple manual operations in the event of malfunction, building blocks or modules of the same type but with different capacity may also be kept on hand so that the pressure control device and/or pressure regulating device may easily be adapted to various requirements. Finally, it is also possible to put to use a variable quantity of building blocks or modules in combination or in succession in the same injection molding machine or in the same injection mold.

In so doing, it is possible not only to operate a plurality of such building blocks or modules at different locations of the same mold cavity of an injection mold, but also to allocate a corresponding quantity of such building blocks or modules to an injection mold having a greater number of mold cavities. Due to the possibility of selective control and regulation of each individual building block or module it is always possible to carry out precise injection of the fluid medium into the respective mold cavity of the injection mold at the desired time, at an appropriate location and with the desired pressure profile. In so doing, it is important that rising pressure profiles as well as falling pressure profiles can be exactly reproduced over the long term with every building block or module. Of course, the pressure profiles may also be entirely constant.

In general, fluid medium to be fed into the cavities of injection molds is normally guided via the pressure control device and/or pressure regulating device proceeding from a pressure generator or pressure accumulator and is subsequently guided out of the cavity, accompanied by expansion, into a compensation vessel from which it may be drawn upon again for the pressure generator. This type of operation with media recovery is common when the medium is air, but particularly when it is nitrogen, which is suitable for reuse after filtering out plastic residue contained therein.

According to the present invention, however, it is also suggested that the pressure generator comprise a nitrogen recovery system. A nitrogen recovery system of this kind is able to filter nitrogen out of normal air or normal compressed air, in particular from highly-compressed air, and deliver this nitrogen to the injection molds via the pressure control device and/or pressure regulating device according to the invention. Apart from the fact that the required nitrogen can be supplied permanently at low cost by means of such a nitrogen recovery system, there is also a reduced operating risk compared to the gas recovery system conventionally used to reduce costs insofar as there is no contamination of nitrogen as can easily happen with recovered nitrogen, e.g., as a result of residual monomers and additives. Additional features and advantages of the invention are described in the following in embodiment examples with reference to the drawings.

DETAILED DESCRIPTION OF THE PREFERRED EMBODIMENTS

For the sake of simplicity, each FIG. 1 to 6 shows only a part of the injection unit 2 of a complete injection molding machine, this part being outfitted with the machine nozzle 1 which is brought into contact with the inlet opening or sprue of an injection mold 3. Parts 3a, 3b, 3c of the injection mold 3 enclose the mold cavity 4 within which the respective molded article can be formed by proportioned introduction of molten plastic.

In order to form hollow spaces within the manufactured molded article expediently, it is necessary also to supply a fluid medium such as air or gas, in particular nitrogen, into the mold cavity 4 of the injection mold 3 in addition to the molten plastic. For this purpose, it is necessary to provide the injection mold 3 with a special injection system such as that shown in FIGS. 1 to 6.

The injection systems shown in FIGS. 1 to 4 are constructed in such a way that the fluid medium, e.g., nitrogen, which is to be fed to the injection mold 3 in addition to the molten plastic, can be fed directly into the mold cavity 4 by means of the nozzle 1 of the injection molding unit 2.

Figure 2:
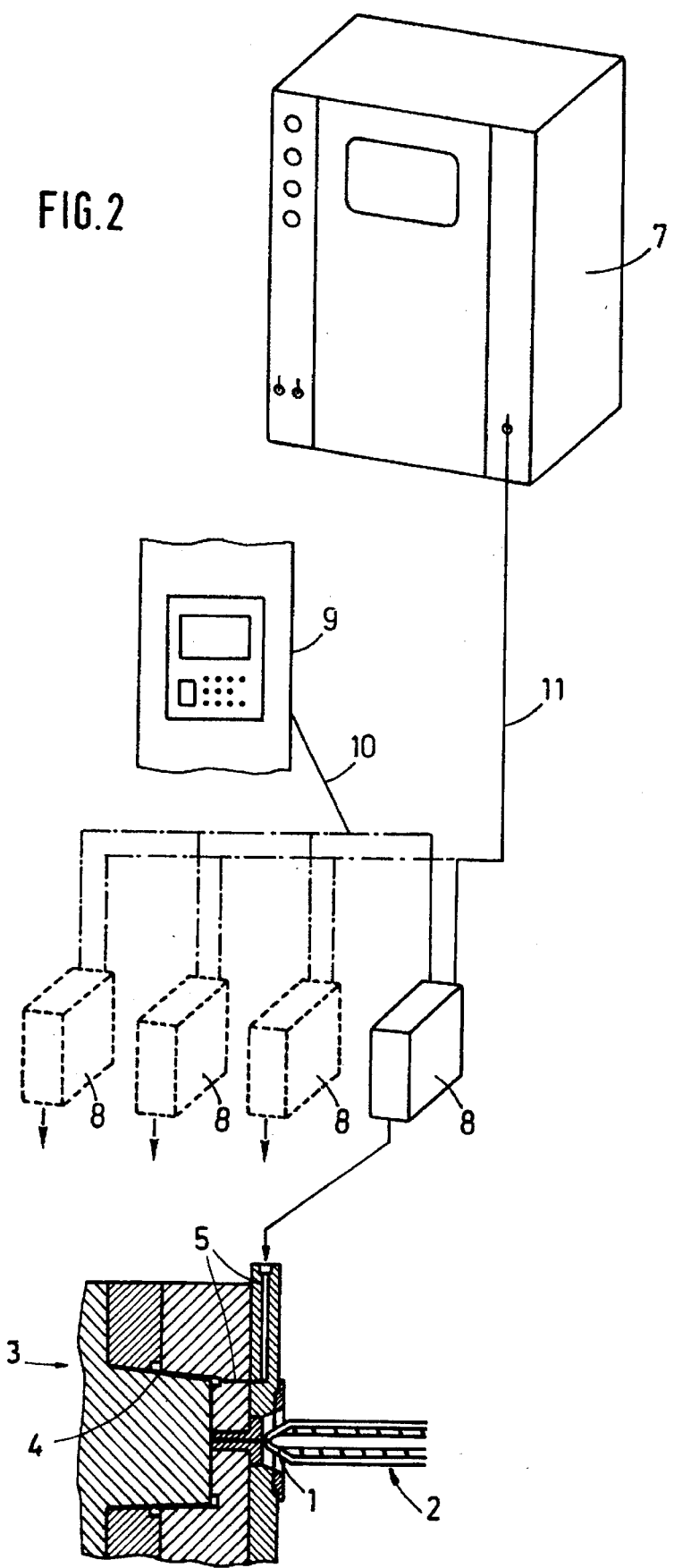
Figure 3:
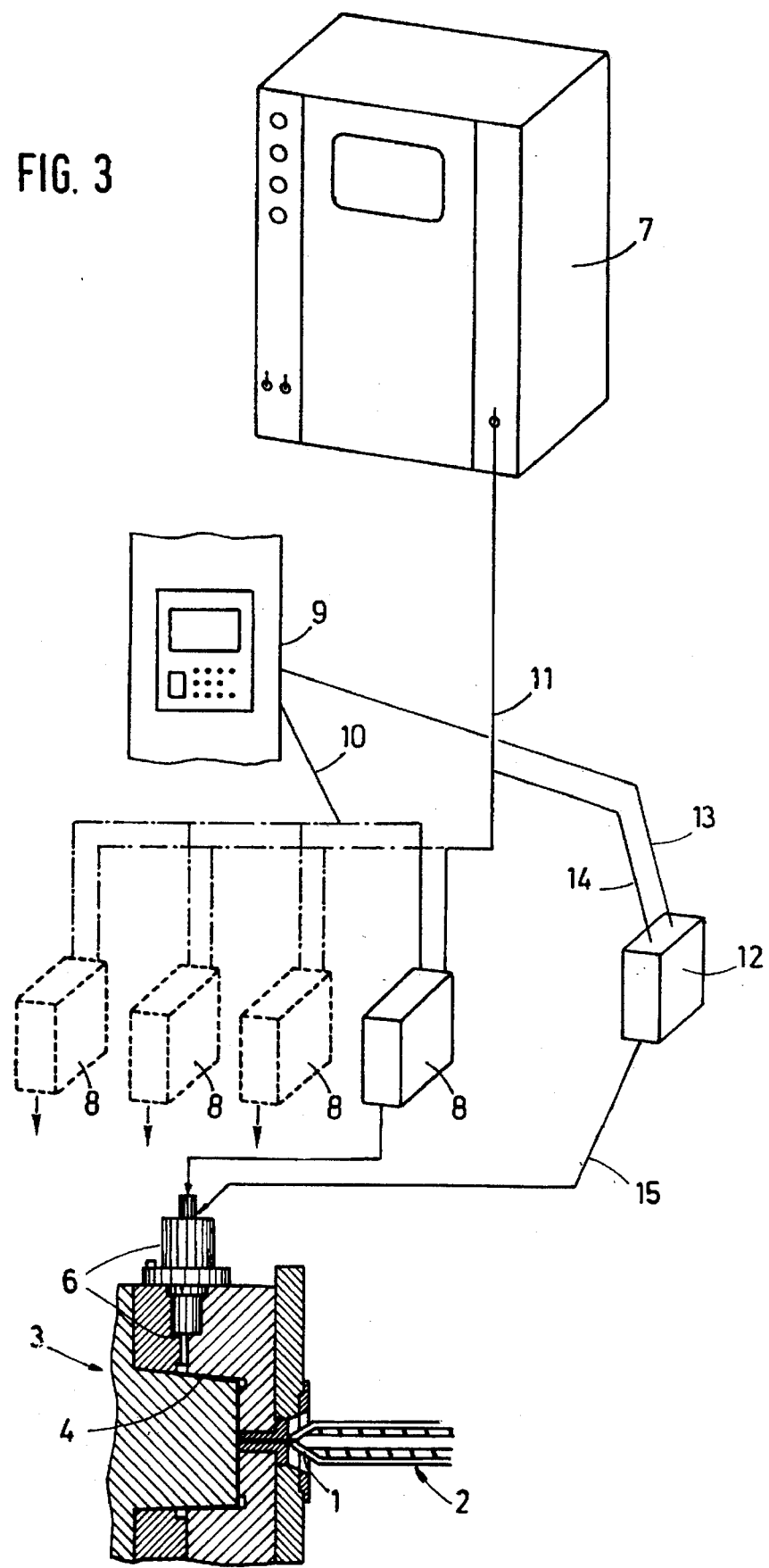
Figure 5:
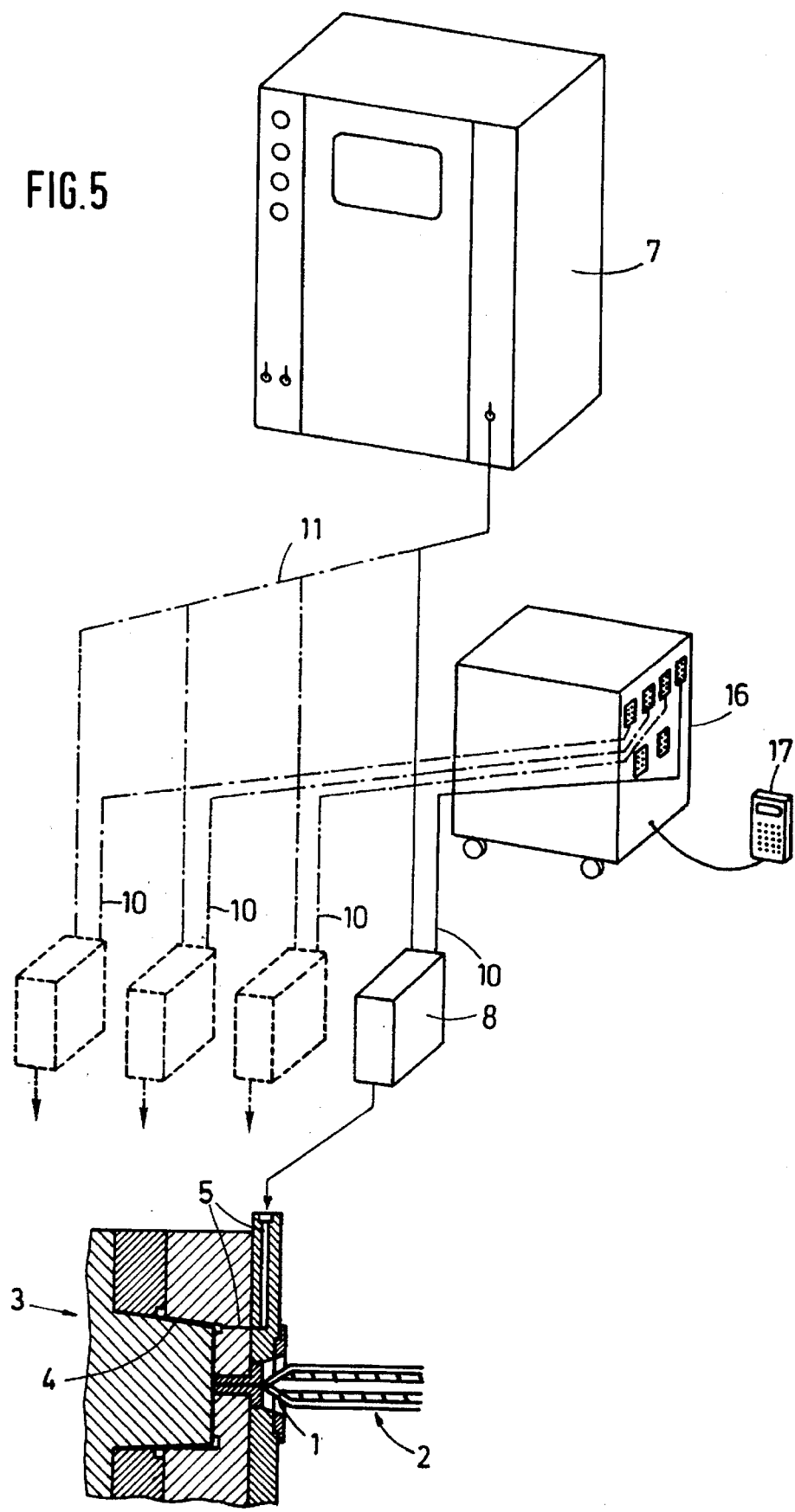
Figure 6:
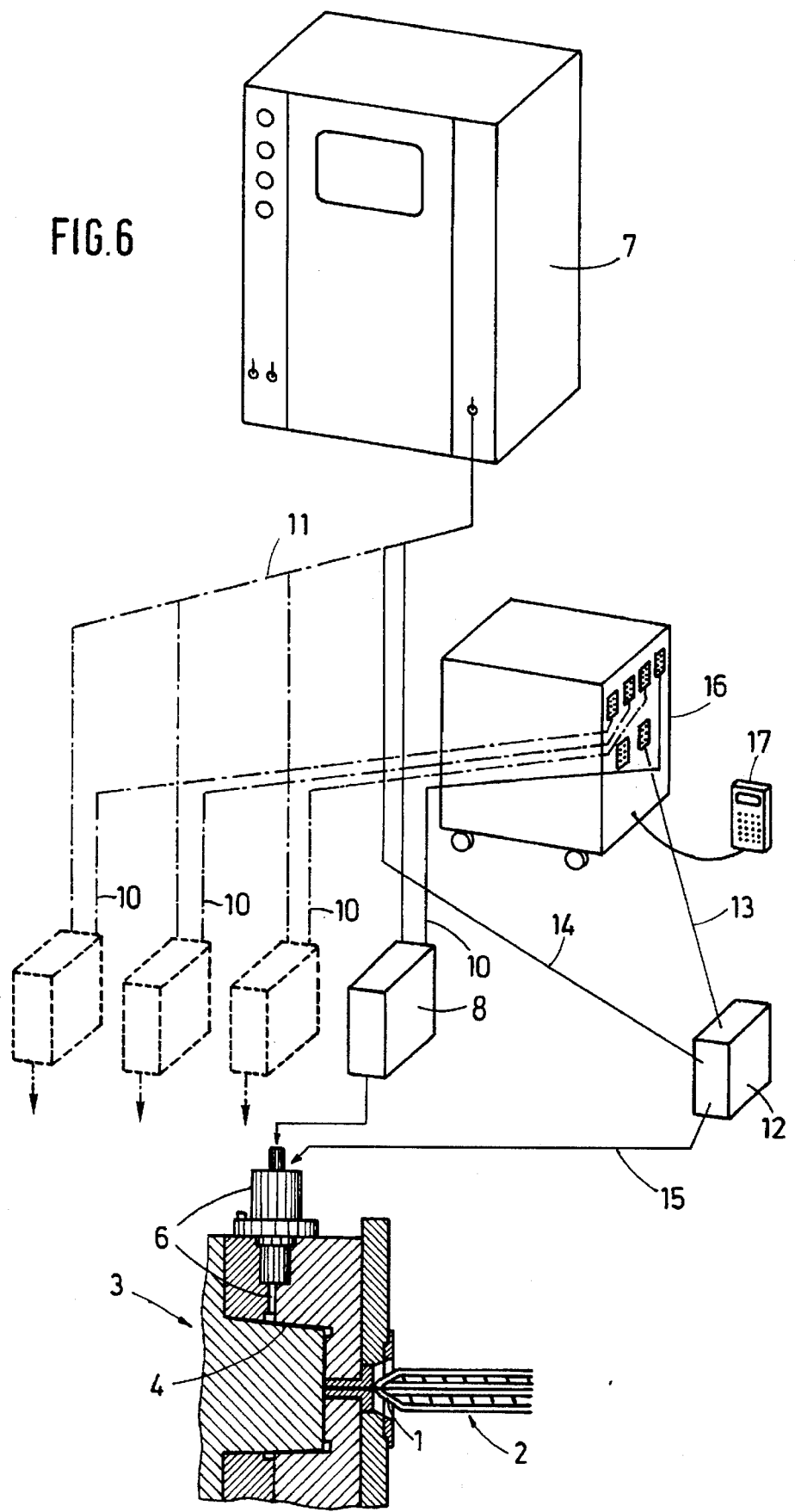

In the injection systems according to FIGS. 2 and 5, however, the fluid medium, e.g., nitrogen, is fed into the mold cavity 4 of the injection mold 3 by means of stationary hollow-needle injection building blocks 5, while movable hollow-needle building blocks 6 are used in FIGS. 3 and 6 for the same purpose. Of course, it is also possible to feed the additional fluid medium (nitrogen) into the mold cavity of the injection mold 3 by employing all three possibilities at the same time, in particular for manufacturing relatively complicated molded articles.

Each injection system for the additional fluid medium (nitrogen) shown in FIGS. 1 to 6 comprises a pressure generator unit 7 which commonly has a compressor with a pressure accumulator arranged downstream or has at least a compressed gas canister. However, a nitrogen recovery system can also be used instead. This makes it possible to filter the nitrogen out of highly-compressed air. In this case, an $N_2$ generator, for example, must be arranged upstream of the pressure generator unit 7.

While a conventional pressure generator unit 7 for nitrogen and possibly also for air operates with media recovery for economical reasons, a pressure generator unit 7 with an $N_2$ generator arranged upstream can operate without such a media recovery facility since nitrogen is always available at low cost. The disadvantages that could result for a media recovery device due to contamination by residues of plastics material and additives are eliminated in this case.

An essential component contained in each of the injection systems shown in FIGS. 1 to 6 for feeding fluid medium (nitrogen) in injection molds 3 is a pressure control device and/or pressure regulating device 8 which is comprised in a building block or module and is connected in at least one unit between the injection mold 3 and the pressure generator unit 7. At least one such pressure control device and/or pressure regulating device 8 is to be provided in each injection system. However, a plurality of such pressure control devices and/or pressure regulating devices can also be provided at the same time and operated independently from one another as will be apparent from the additional units indicated in dash-dot lines in FIGS. 1 to 6.

Figure 1:
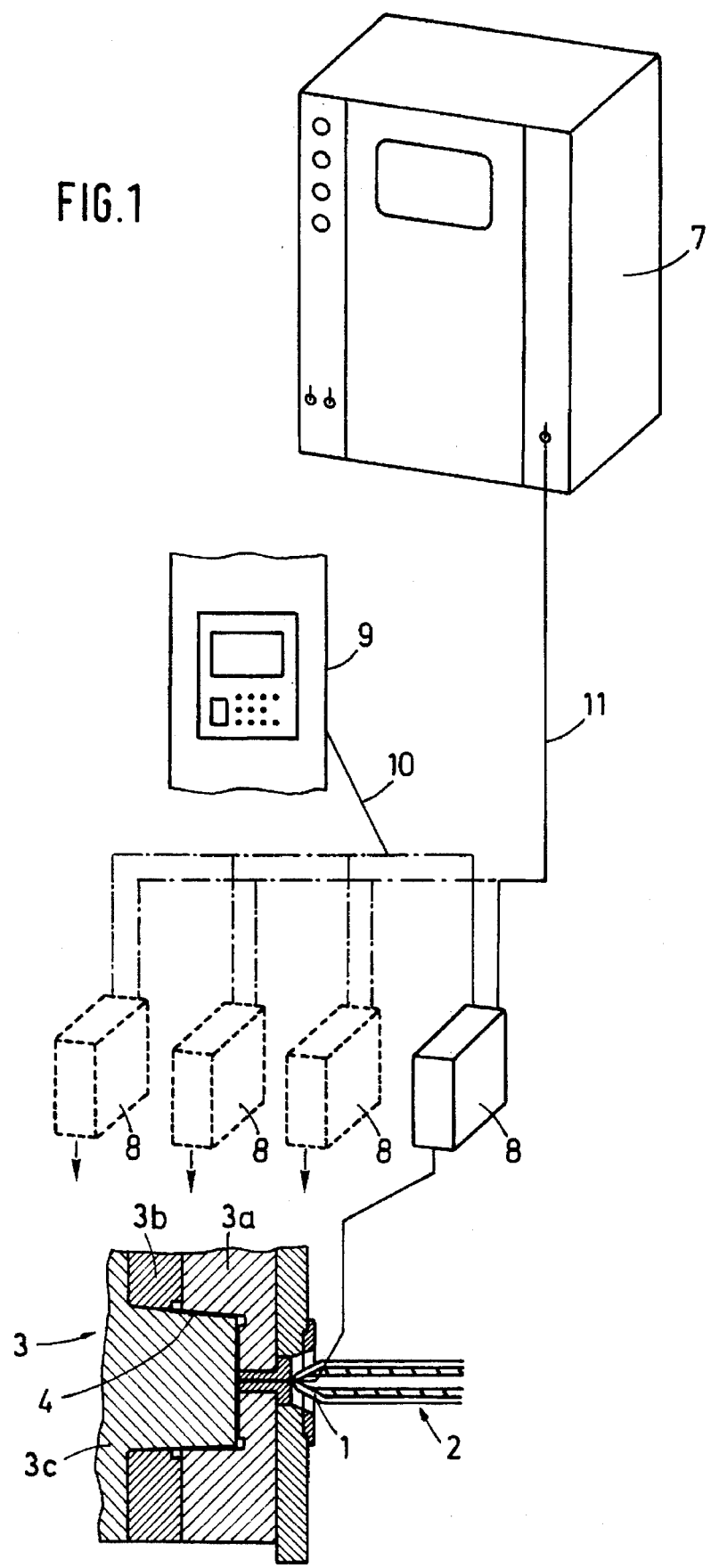
FIGS. 1 to 3 are, respectively, schematically simplified views showing various systems for producing injection-molded articles which have deliberately formed hollow spaces in their interior region, these systems comprising a stationary pressure control device and/or pressure regulating device in addition to a pressure generating unit and a media injection unit.

In the injection systems according to FIGS. 1 to 3, the electrical control unit 9 for the pressure control device and/or pressure regulating device 8 and the pressure control devices and/or pressure regulating devices 8 are stationary, e.g., fitted to the injection molding machine, so that they can be influenced directly via line connections 10, whereas, on the other side, they are connected with the pressure generator unit 7 via pipes, hoses and screw connections 11. The injection system according to FIG. 3 has, in addition, a so-called pressure movement device 12 which has a line connection 13 to the electrical control unit 9 of the injection molding machine and also communicates with the pressure generator unit 7 via pipes, hoses and screw connections 14. The traveling movement for the hollow-needle injection building block 6 is produced by this pressure movement device 12 via pipes, hoses and screw connections or the like and is, in fact, acted upon by the same fluid medium (nitrogen) which must also be fed into the mold cavity 4 of the injection mold 3. Thus, leakage of the medium displacing the hollow-needle injection building block 6 cannot contaminate the medium to be fed into the mold cavity 4.

Figure 4:
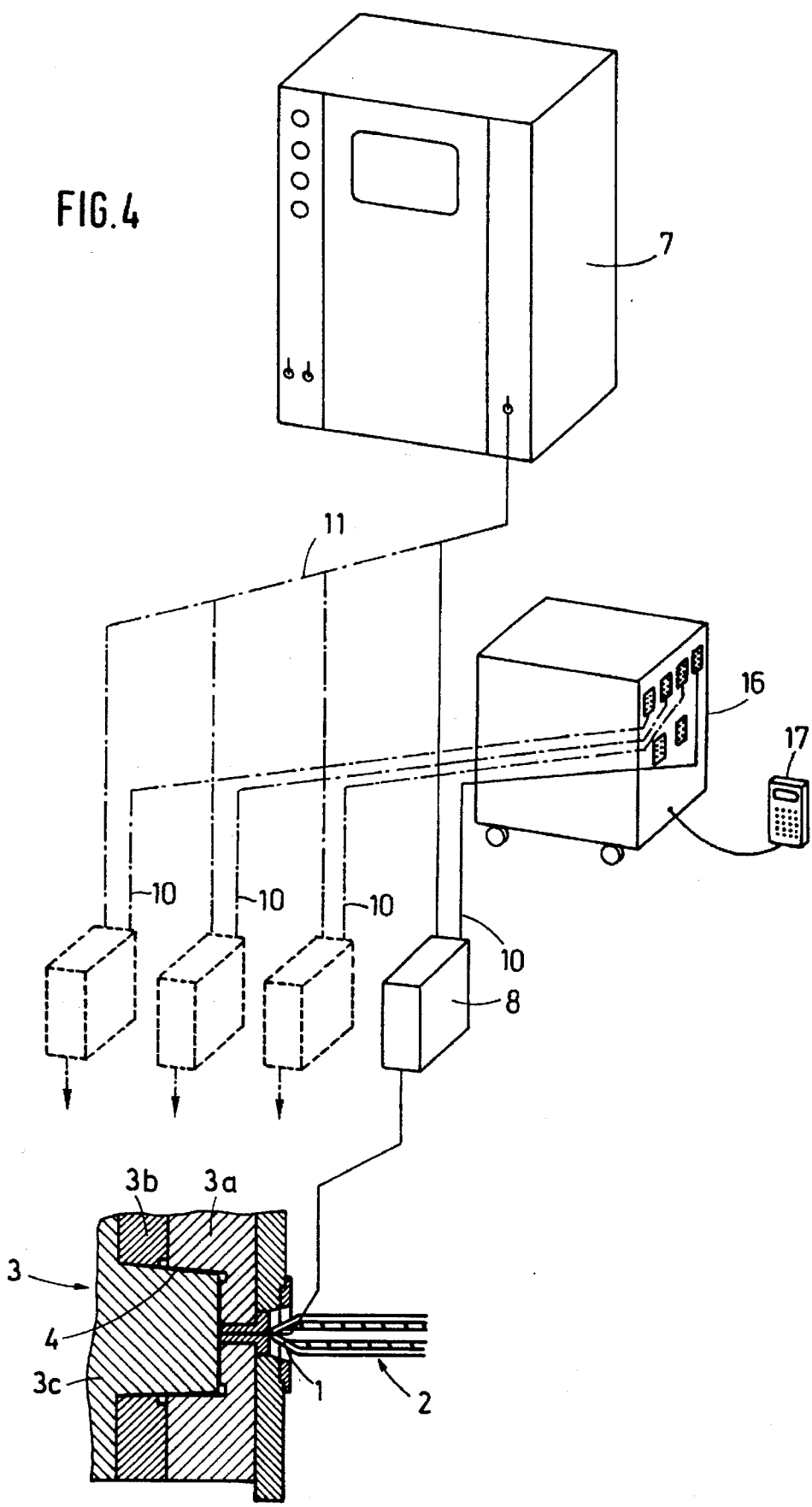
FIGS. 4 to 6 show, also in schematically simplified views, a system for producing injection-molded articles which have deliberately formed hollow spaces in their interior region, these systems being outfitted between a pressure generating unit and a media injection unit with a mobile pressure control device and/or pressure regulating device.

In the injection systems according to FIGS. 4 to 6, the pressure control devices and/or pressure regulating devices 8 are provided as mobile units and are also electrically connected with a mobile control box 16 via line connections 10. On the other side, however, they are also connected to the pressure generator unit 7 via pipes, hoses and screw connections 11. A manually programmable device 17 can be connected with the mobile control box 16. The control box 16 is connected with the machine control via an interface.

The injection system according to FIG. 6 is likewise provided with a pressure movement device 12 which can influence the movable hollow-needle injection building block 7 via pipes, hoses and screw connections 15, more particularly in dependence on a line connection 13 to the mobile control box 16 and a connection with the pressure generator unit produced by pipes, hoses and screw connections 14.

Figure 7:
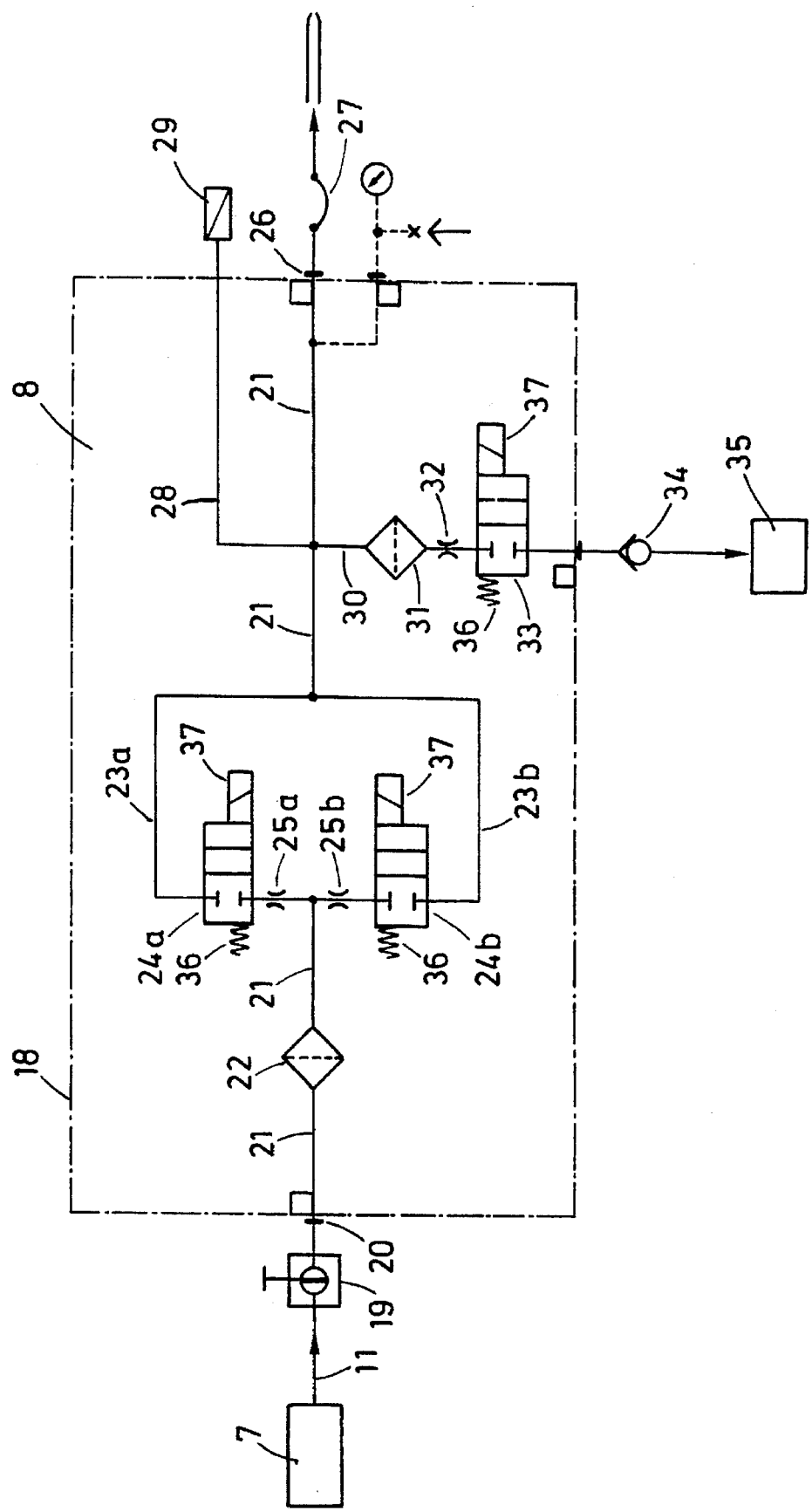
FIG. 7 shows an overview of the inventive construction of a pressure control device and/or pressure regulating device which can be used in the systems shown in FIGS. 1 to 6 singly or in multiple arrangement within the stationary or mobile control unit.

FIG. 7 shows the construction of a pressure control device and/or pressure regulating device 8 in detail. It will be seen that the pressure control device and/or pressure regulating device 8 as a whole is accommodated in a housing 18 and in this way forms a building block or module which can be influenced manually from outside the housing 18 only by means of a shut-off valve 19.

The shut-off valve 19 communicates, via a screw connection 20 or the like pipe coupling, with a main line 21 in which a filter 22 is arranged. Downstream of the filter 22, this main line 21 branches into at least two parallel flow paths 23a and 23b. A media inflow control valve 24a designed as a two-way directional control valve is arranged in flow path 23a and a media inflow control valve 24b, likewise designed as a two-way directional control valve, is arranged in flow path 23b. Each of these media inflow control valves 24a, 24b can be constructed as a seat valve or may be formed by another remote-controllable valve, e.g., a proportional valve, which can be controlled so as to let through or block flow as required. A special throttle valve 25a and 25b, respectively, is associated with each media inflow control valve 24a, 24b, e.g., on the inflow side. Cross-section ratios of 1.0:0.8, for instance, are selected for the two throttle valves 25a and 25b. The two flow paths 23a and 23b converge again downstream of the two media inflow control valves 24a and 24b to form a main pipe train 21 which terminates at its other end in a screw connection or the like connection coupling 26. The main line 21 can be connected to the injection mold 3 via this screw connection 26 or comparable coupling, e.g., with the intermediary of a flexible line 27, either via the machine nozzle 1 of the injection unit 2 or via a hollow-needle injection building block 5 or 6, as required.

Downstream of the junction of the two flow paths 23a and 23b, a first branch line 28 branches off from the main line 21 and can act upon one side of a pressure sensor 29. The other side of the pressure sensor 29 is sensitive to the pressure within the mold cavity 4 in the injection mold 3. A second branch line 30 leads to a compensation vessel 35 via a filter 31, a throttle valve 32, a media outflow control valve 33 designed as a two-way directional control valve, and a non-return valve or check valve 34. This compensation vessel 35 can be connected in turn to the pressure generator unit 7 via a connection which is not shown in the drawing. The throttle valve 32 has the same design as throttle valve 25b, while the media outflow control valve 33 conforms to the media inflow control valves 24a and 24b with respect to design and operation.

It is noted in addition that all media inflow control valves 24a, 24b and the media outflow control valve 33 are constructed in the embodiment example shown in the drawing as seat valves which are held in the blocking position by spring force 36. However, these seat valves can be switched so as to let through flow by a remote-controlled actuator, e.g., an electromagnet 37. The remote controls, e.g., electromagnet 37, are influenced by the pressure sensor 29, more particularly as a function of the pressure difference determined between the pressure in branch line 28 and the pressure in the mold cavity 4 of the injection mold 3.

Figure 8:
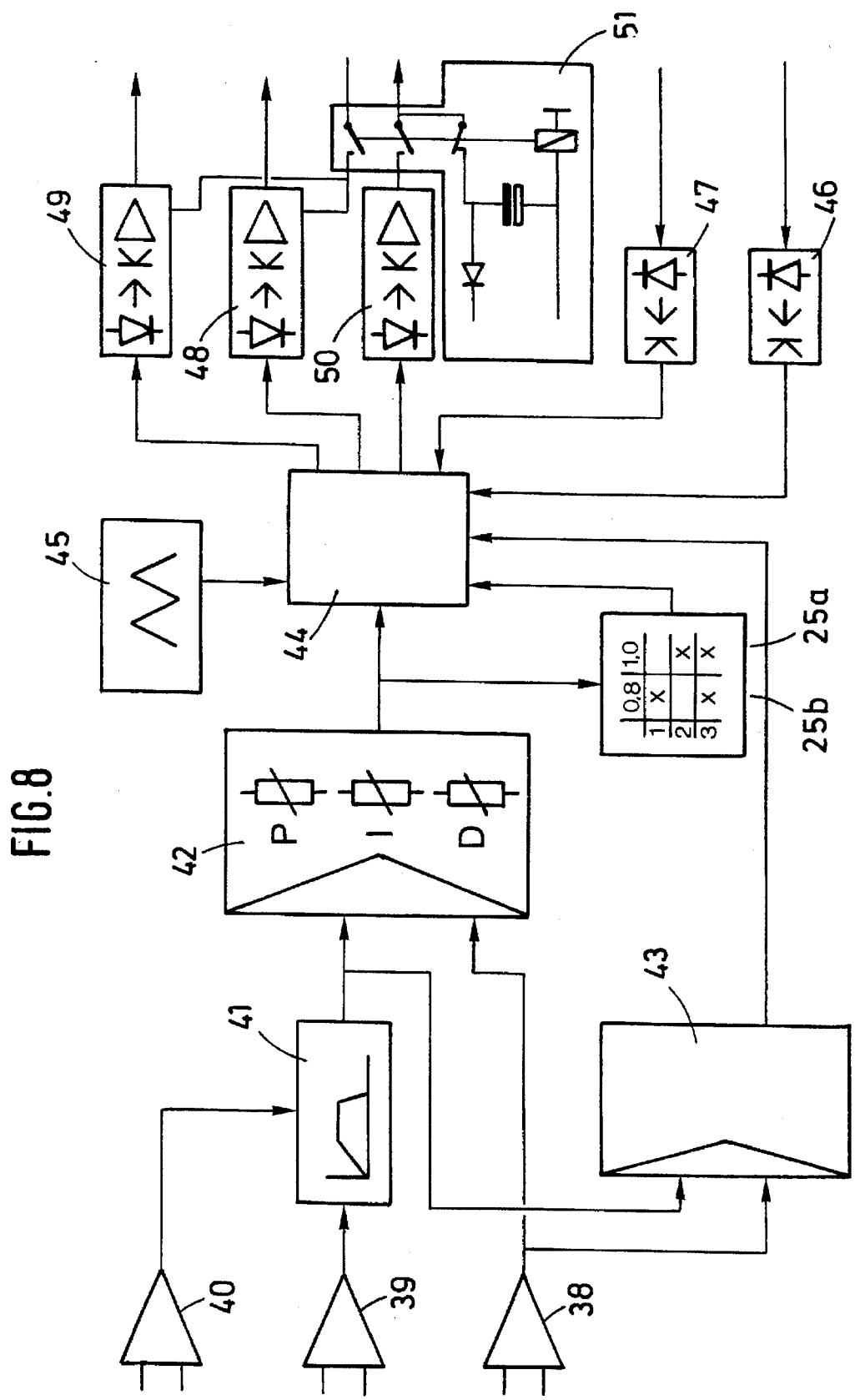
FIG. 8 shows a block diagram of a pressure control device and/or pressure regulating device shown in FIG. 7.

The manner of operation of a pressure control device and/or pressure regulating device 8 as shown in FIG. 7 will be apparent from the following functional description of the block diagram in FIG. 8.

According to FIG. 8, the pressure control device and/or pressure regulating device has three differential amplifier inputs 38, 39 and 40, namely the actual pressure value input 38, reference pressure value input 39 and a ramp reference value input 40. The reference pressure value input 39 and the ramp reference value input 40 cooperate with the input sides of a ramp adjuster 41 whose output is likewise fed to the input side of a PID controller 42 as is the output of the actual pressure value differential amplifier 38.

The ramp adjuster 41 is so designed that it forms a gradually rising output signal from a suddenly rising input signal. The rise time and fall time of the output signal can be adjusted via the ramp reference value differential amplifier 40.

The output of the ramp adjuster 41 also acts upon the input side of a comparator 43 which is further influenced by the output of the actual pressure value differential amplifier 38.

The output of the PID controller 42 is applied to a first input of a logic circuit 44 on one hand and is connected to the diaphragms of the two throttle valves 25a and 25b on the other hand.

A clock generator or oscillator 45 acts on the logic circuit 44 via a second input. The output of the diaphragm adjuster 25a/25b for the throttle valves 25a and 25b is connected to a third input of the logic circuit 44, while a fourth input of the logic circuit 44 is influenced by the output of the comparator 43. A switching device 46 is connected to a fifth input of the logic circuit 44 and generates a signal when the pressure control device and/or pressure regulating device 8 is switched on, while a switching device 47 which generates a signal when the two-way directional control valve 33 and accordingly the throttle valve 32 is switched to let through flow is connected to a sixth input of the logic circuit 44.

The logic circuit 44 has three outputs, of which the first operates on a final control element 48, the second on a final control element 49 and the third on a final control element 50 of the regulating circuit shown in FIG. 8. Final control element 48 of this regulating circuit cooperates with the media inflow control valve 24a according to FIG. 7, while final control element 49 of this regulating circuit influences the media inflow control valve 24b according to FIG. 7 and final control element 50 acts on the media outflow control valve 33 according to FIG. 7.

The comparator 43 compares the reference pressure value with the actual pressure value. As long as the actual pressure value remains less than the reference pressure value, only the media inflow control valves 24a and 24b are released. When the actual pressure value reaches the reference pressure value, the media inflow control valves 24a and 24b and the media outflow control valve 33 are switched off and accordingly moved to the blocking position.

The PID controller 42 compares the actual pressure value and the reference pressure value and, depending on the deviation from the value set by the ramp adjuster, generates an adjusting signal of corresponding magnitude. Depending on the value of this adjusting signal, the logic circuit 44 selects which of the two media inflow control valves 24a and 24b to release via the final control elements 48 and 49.

If there is only a small deviation, only media inflow control valve 24b which cooperates with the throttle valve 25b having the small opening (0.8 ram) is controlled. If the deviation is of medium magnitude, only media inflow control valve 24a which cooperates with the throttle valve 25a with the larger opening cross section (1.0) is controlled via final control element 49. However, if the deviation is large, both final control elements 48 and 49 cause both media inflow control valves 24a and 24b to be switched to let through flow so that the greatest possible amount of fluid medium can pass through.

The signals from the clock generator or oscillator 45, PID controller 42, diaphragm 25a/25b and switching devices 46 and 47 are combined in the logic circuit 44 and fed to the final control elements 48, 49 and 50 of the regulating circuit. The function 51 which is associated with final control element 50 and comprises a diode, capacitors and a relay provides that the media outflow control valve 33 is controlled in every case after switching off the supply voltage for the entire pressure control device and/or pressure regulating device 8 and ensures that the pressure in the mold cavity 4 in the injection mold 3 will be relieved.

Finally, it is noted that each building block or module enclosed by a housing 18 comprises not only the constructional and functional components according to FIG. 7, but also all respective constructional and functional components according to FIG. 8 and accordingly each pressure control device and/or pressure regulating device 8 is capable of being used as an autonomous device which can be associated, along with one or more units, with every injection system outfitted with the appropriate interfaces.

List Of Reference Numbers 1 machine nozzle
2 injection unit
3 injection mold
3a, 3b, 3c mold parts
4 mold cavity
5 stationary hollow-needle injection building block
6 movable hollow-needle injection building block
7 pressure generator/pressure accumulator unit
8 pressure control device and/or pressure regulating device
9 electric control unit
10 line connection
11 pipe, hose, screw connection
12 pressure movement device
13 line connection
14 pipe, hose, screw connection
15 pipe, hose, screw connection
16 mobile control box
17 manually programmable device
18 housing
19 shut-off valve
20 screw connection
21 main line
22 filter
23a, 23b parallel flow paths
24a, 24b media inflow control valve
25a, 25b throttle valve
26 screw connection
27 flexible line
28 first branch line
29 pressure sensor
30 second branch line
31 filter
32 throttle valve
33 media outflow control valve
34 check valve
35 compensation vessel
36 spring force
37 electromagnet
38 actual value differential amplifier
39 reference value differential amplifier
40 ramp reference value differential amplifier
41 ramp adjuster
42 PID controller
43 comparator
44 logic circuit
45 clock generator/oscillator
46 switching device
47 switching device
48 final control element for media inflow control valve 24a
49 final control element for media inflow control valve 24b
50 final control element for media outflow control valve 33
51 function

We claim:

1. A pressure device for controlling and regulating fluid medium fed to an injection mold in addition to molten plastics and arranged between a pressure source of the fluid medium and injection means for injecting the fluid medium into the injection mold, said pressure controlling and regulating device comprising:

a main line extending between the pressure source and the injection means;

at least two parallel flow paths branching from said main line;

two inflow control valves having different flow cross-sections for controlling flow in said at least two flow paths, respectively;

first and second branch lines branching from said main line downstream of a junction of said two flow paths, one of said first and second branch lines including an outflow control valve for controlling an amount of the fluid medium fed to the mold;

a pressure sensor for sensing pressure of the fluid medium in the mold, said pressure sensor having one side thereof connectable with the mold, and another of said first and second branch lines being connected with another side of said sensor, said pressure sensor controlling operation of said outflow control valve; and a final control element of a regulating circuit for stepwisely controlling at least one of said inflow control valves in accordance with a control signal generated by said pressure sensor and representing a pressure difference between the pressure in the mold and pressure in said another of said first and second branch lines.

2. A pressure controlling and regulating device according to claim 1, wherein said pressure controlling and regulating device is formed as a mobile unit.

3. A pressure controlling and regulating device according to claim 1, wherein a ratio of the flow cross-section of the inflow control valve having a larger cross-section and the flow cross-section of the inflow control valve having a smaller cross-section, is 1.0:.8, and wherein the outflow control valve has a cross-section corresponding to the smaller cross-section.

4. A pressure controlling and regulating device according to claim 1, further comprising an actual pressure valve input connected with an output of said pressure sensor, a reference pressure valve input, a PID controller and a logic circuit for controlling said two inflow control valves and said outflow control valve, said PID controller being connected with said actual and reference pressure valve inputs, and a ramp adjuster, which is arranged between said reference pressure valve input and said PID controller, for predetermining a pressure profile sensed by said pressure sensor by changing timing of communication of a reference pressure valve signal to said PID controller.

5. A pressure controlling and regulating device according to claim 4, further comprising an actual pressure value differential amplifier, a reference pressure value differential amplifier, and a pressure profile differential amplifier, said PID controller having a first input directly communicating with an output of said actual pressure value differential amplifier, and a second input communicating with an output of said ramp adjusted, and said ramp adjuster having two inputs communicating with said reference pressure value amplifier and said pressure profile amplifier.

6. A pressure controlling and regulating device according to claim 5, further comprising a comparator communicating with the outputs of said actual pressure value amplifier and said ramp adjuster.

7. A pressure controlling and regulating device according to claim 6, further comprising a clock generator, a diaphragm signal transmitter, and three final control elements for said two inflow control valves and said outflow control valve, respectively, said logic circuit having four inputs connected, respectively, with said PID controller, said clock generator, said signal transmitter, and said comparator, and three outputs connected, respectively, with said three final control elements.

8. A pressure controlling and regulating device according to claim 7, further comprising a first switching device actuated upon actuation of said pressure controlling and regulating device, and a second switching device actuated upon actuation of said outflow control valve.

9. A pressure controlling and regulating device according to claim 4, comprising a housing in which all fluidic and electronic control components of said device are located so that a pressure controlling and regulating module is formed, said housing including contact connector means for an electrical actuation of the electronic control components and coupling connector means for a fluidic actuation of the fluidic control components.

10. A system for feeding nitrogen to an injection mold in addition to molten plastics, said nitrogen feeding system comprising:

a nitrogen source;

a nitrogen recovery arrangement for filtering nitrogen out of air located upstream of the nitrogen source; and a pressure device for controlling and regulating flow of nitrogen to an injection mold and arranged between nitrogen source and injection means for injecting nitrogen into the injection mold, said pressure controlling and regulating device comprising:

a main line extending between the pressure source and the injection means;

at least two parallel flow paths branching from said main line;

two inflow control valves having different flow cross-sections for controlling flow in said at least two flow paths, respectively;

first and second branch lines branching from said main line downstream of a junction of said two flow paths, one of said first and second branch lines including an outflow control valve for controlling an amount of the fluid medium fed to the mold;

a pressure sensor for sensing pressure of the fluid medium in the mold, said pressure sensor having one side thereof connectable with the mold, and another of said first and second branch lines being connected with another side of said sensor, said pressure sensor controlling operation of said outflow control valve; and a final control element of a regulating circuit for stepwisely controlling at least one of said inflow control valves in accordance with a control signal generated by said pressure sensor and representing a pressure difference between the pressure in the mold and pressure in said another of said first and second branch lines.

* * * * *